(12) United States Patent
Gardaz et al.

(10) Patent No.: US 10,942,367 B2
(45) Date of Patent: Mar. 9, 2021

(54) METHOD OF MANUFACTURING SPECTACLE ARMS

(71) Applicant: KILLINE OPTICAL LTD, Macao (MO)

(72) Inventors: François Gardaz, Macao (MO); Hervé François Serge Jacquier, Lisbonne (PT); Marc René André Louis Lefebvre, Macao (MO)

(73) Assignee: KILLINE OPTICAL LTD, Macao (MO)

( * ) Notice: Subject to any disclaimer, the term of this patent is extended or adjusted under 35 U.S.C. 154(b) by 16 days.

(21) Appl. No.: 16/539,080

(22) Filed: Aug. 13, 2019

(65) Prior Publication Data
US 2020/0050017 A1   Feb. 13, 2020

(30) Foreign Application Priority Data

Aug. 13, 2018  (FR) ...................................... 18 57467

(51) Int. Cl.
| | | |
|---|---|---|
| *B29D 12/02* | (2006.01) | |
| *G02C 5/18* | (2006.01) | |
| *B21D 28/10* | (2006.01) | |
| *G02C 5/00* | (2006.01) | |

(52) U.S. Cl.
CPC ............... *G02C 5/18* (2013.01); *B21D 28/10* (2013.01); *B29D 12/02* (2013.01); *G02C 5/008* (2013.01)

(58) Field of Classification Search
CPC ............ G02C 5/18; B29D 12/02; Y10T 29/31
See application file for complete search history.

(56) References Cited

U.S. PATENT DOCUMENTS 1,825,427 A    9/1931   Siddall

FOREIGN PATENT DOCUMENTS

| | | | |
|---|---|---|---|
| DE | 2342314 | 2/1975 | |
| FR | 2497476 | 7/1982 | |
| FR | 2497476 A1 * | 7/1982 | ............. B29D 12/02 |
| KR | 1020160037504 | 4/2016 | |

OTHER PUBLICATIONS

English translation FR 2497476 A1 (Year: 1982).*
Preliminary Search Report for French Application 18/57467, dated May 22, 2019.

* cited by examiner

*Primary Examiner* — Jason L Vaughan
*Assistant Examiner* — Amanda Kreiling
(74) *Attorney, Agent, or Firm* — Burris Law, PLLC

(57) ABSTRACT

A method of manufacturing spectacle arms includes grooving an inner face of a first cover plate to form grooves and providing a gauge with longilineal inserts. Front and rear bridges join front and rear ends of the longilineal inserts and provide front and rear indexing. The gauge is set on the inner face of the first cover plate such that the longilineal inserts are disposed in the grooves and a second cover plate is pressed and bonded on the inner face of the first plate such that the longilineal inserts are inserted between the first and second cover plates. The plates are cut around the longilineal inserts with a cutting tool after the cutting tool is positioned and held in place using corresponding front and rear tool indexing.

11 Claims, 4 Drawing Sheets

METHOD OF MANUFACTURING SPECTACLE ARMS

CROSS-REFERENCE TO RELATED APPLICATIONS

Figure 1:

This application claims priority to and the benefit of FR FR1857467 filed on Aug. 13, 2018. The disclosure of the above application is incorporated herein by reference.

FIELD

The present disclosure relates to a method of manufacturing spectacle arms.

BACKGROUND

The statements in this section merely provide background information related to the present disclosure and may not constitute prior art.

In the eyeglasses industry, it is known to use cover plates, and in particular laminated cover plates, which enclose longilineal inserts to form the external coverings.

However, it is difficult to industrially obtain adjusted cover plates around the longilineal inserts with accurate and controlled shapes.

The present disclosure addresses issues related to manufacturing spectacle arms that provide an accurate adjustment of the cover plates around the longilineal inserts, as well as other issues related to the manufacture of spectacle arms.

SUMMARY

To this end, it proposes a method of manufacturing spectacle arms, comprising the following steps of:

grooving an inner face of a first cover plate, so as to form several grooves in said inner face extending parallel and spaced apart one after the other;

providing a gauge comprising:

several longilineal inserts extending parallel and spaced apart one after the other and having respective front and rear ends;

a front bridge joining the front ends of all the longilineal inserts and having front indexing disposed between the longilineal inserts;

a rear bridge joining the rear ends of all the longilineal inserts and having rear indexing disposed between the longilineal inserts;

setting the gauge on the inner face of the first cover plate, so that all the longilineal inserts are disposed inside the grooves and that the front and rear bridges protrude from the first cover plate;

pressing and bonding a second cover plate on the inner face of the first cover plate, so that the longilineal inserts are inserted between the first cover plate and the second cover plate and that the front and rear bridges protrude from the first cover plate and the second cover plate;

cutting the first cover plate and the second cover plate with a cutting tool around the longilineal inserts in order to form spectacle arms, wherein the cutting tool, prior to cutting around a longilineal insert, is positioned and held in place with respect to said longilineal insert by cooperating with front indexing and rear indexing adjacent to said longilineal insert.

Accordingly, the cover plates are adjusted around the longilineal inserts via the grooves and are cut in an accurate manner due to the front and rear indexing which provide a centered cut around the longilineal inserts.

According to one feature, the front indexing and the rear indexing are formed by holes or notches, and the cutting tool, prior to cutting around a longilineal insert, is positioned and held in place with respect to said longilineal insert by pins engaged into the holes or notches forming the front indexing and the rear indexing adjacent to said longilineal insert.

According to another feature, the method comprises a step of manufacturing the first cover plate by stacking and bonding at least two layers of material in order to obtain a first laminated cover plate.

In a particular form, the layers of material of the first cover plate are wood layers.

Alternatively, the first cover plate is formed of a single layer of material, in particular a single wood layer.

According to at least one variation of the present disclosure, the second cover plate is formed of a single layer of material, and in particular of a single layer of material formed of the same material as one of the layers of material of the first cover plate.

According to some variations of the present disclosure, the method comprises a step of manufacturing the second cover plate by stacking and bonding at least two layers of material in order to obtain a second laminated cover plate.

Advantageously, the layers of material of the first laminated cover plate are formed of the same material as the layers of material of the second laminated cover plate.

According to one variation, the longilineal inserts do not project from the inner face of the first cover plate, and the second cover plate is planar.

According to one variant, the longilineal inserts project from the inner face of the first cover plate, and the second cover plate is also provided with grooves for the longilineal inserts.

In a particular form, in the gauge, the longilineal inserts are extended by rear rods, beyond the rear bridge, so that said rear rods protrude from the first cover plate and the second cover plate after the step of pressing and bonding the second cover plate; such rear rods subsequently forming the rear rods of the spectacle arms adapted to be bent and to bear against the ears of the wearers.

In accordance with another advantageous feature of the present disclosure, the gauge is completely metallic.

The present disclosure also concerns the feature according to which the method comprises a step of cutting the front bridge and the rear bridge, between the longilineal inserts, in order to disengage the spectacle arms from one another.

Further areas of applicability will become apparent from the description provided herein. It should be understood that the description and specific examples are intended for purposes of illustration only and are not intended to limit the scope of the present disclosure.

DRAWINGS

Figure 8:
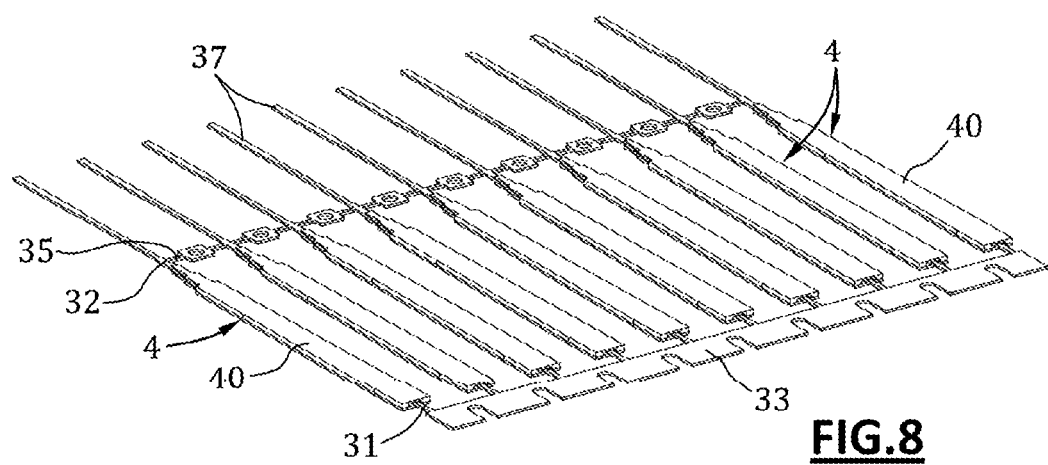
Figure 9:
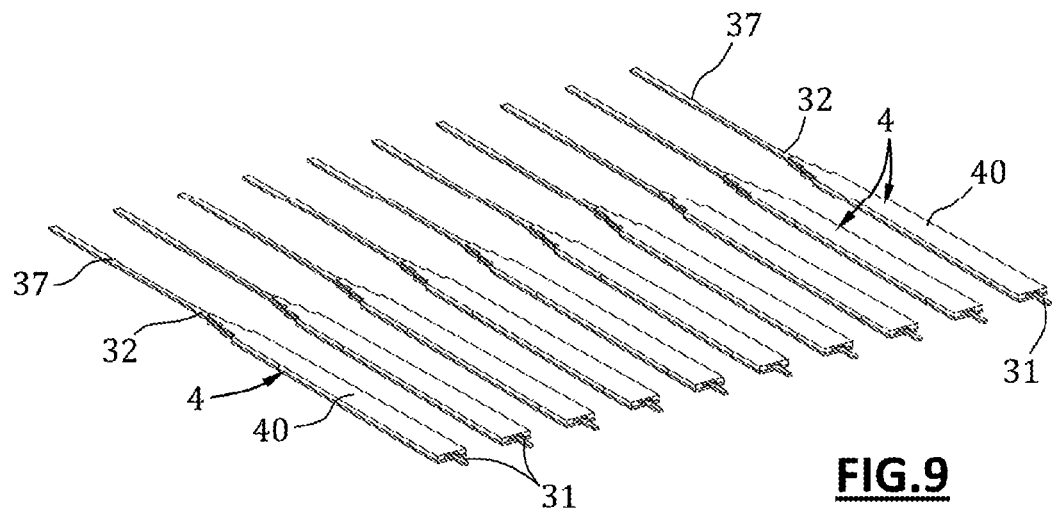
Figure 10:
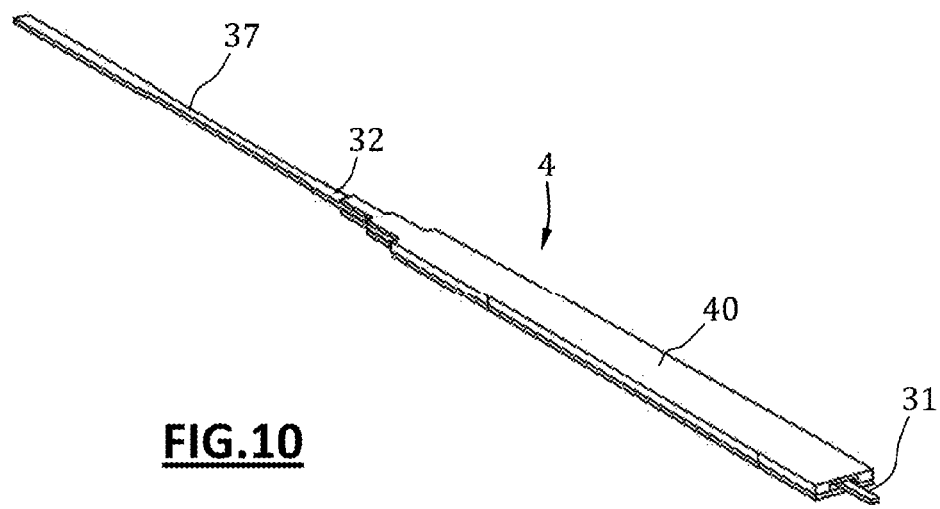

In order that the disclosure may be well understood, there will now be described various forms thereof, given by way of example, reference being made to the accompanying drawings, in which:

FIGS. 1 to 9 illustrate successive steps of a method of manufacturing spectacle arms according to the teachings of the present disclosure; and FIG. 10 illustrates one single spectacle arm made by a method of manufacturing spectacle arms according to the teachings of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
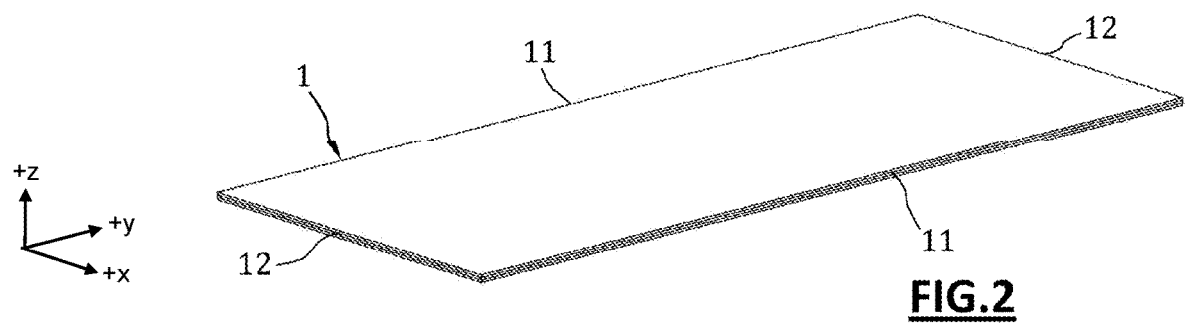

In a first step schematically illustrated in FIGS. 1 and 2, a method of manufacturing spectacle arms according to the teachings of the present disclosure comprises a step of manufacturing a first cover plate 1 by stacking and bonding at least two layers of material 10. In at least one form of the present disclosure the first cover plate 1 is a first laminated cover plate 1.

In the illustrated example, the layers of material 10 are three in number, however, more two layers or more than three layers can be used without limiting the present disclosure. Moreover, in one but non-limiting form of the present disclosure, the layers of material 10 are made of wood in order to form a first cover plate 1 made of laminated wood. However, other types of material, such as plastic or polymeric materials, and natural materials such as horn, among others, can be used.

The first cover plate 1 has a rectangular general shape and has two longitudinal edges 11 opposite lengthwise (y direction), and two transverse edges 12 opposite widthwise (x direction).

Figure 3:
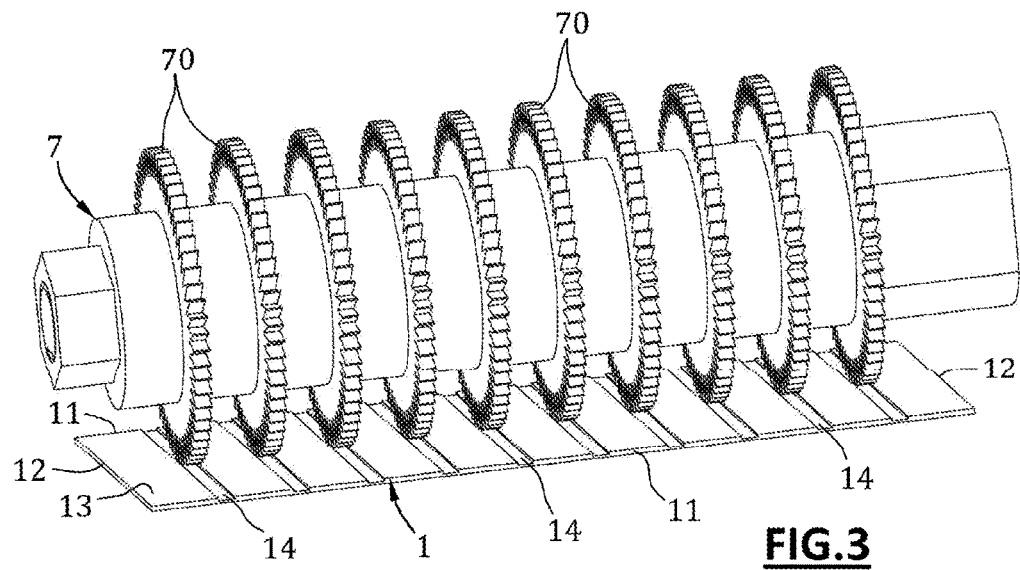
Figure 4:
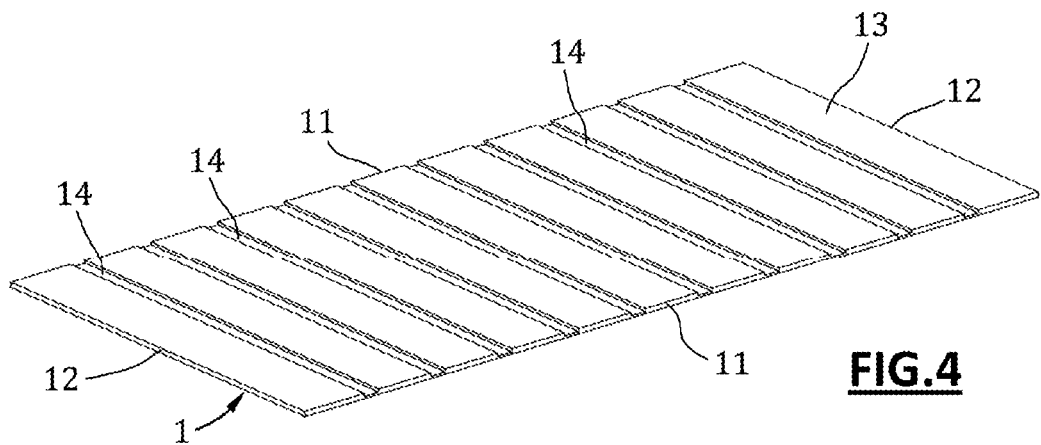

In a second step schematically illustrated in FIGS. 3 and 4, the method comprises a step of grooving an inner face 13 of the first cover plate 1, so as to form several grooves 14 in the inner face 13. The grooves 14 extend parallel to the transverse edges 12 and are spaced apart one after the other. In one variation of the present disclosure the grooves 14 extend over the entire width of the first cover plate 1, from one longitudinal edge 11 to the other longitudinal edge 11.

As shown in FIG. 3, this grooving may be made by a rotary grooving machine 7 provided with several grooving wheels 70 with teeth and the grooving wheels 70 are disposed one after the other along a pivot axis. In some variations of the present disclosure each grooving wheel 70 makes a groove 14 so that all the grooves 14 are made in one single pass.

Figure 5:
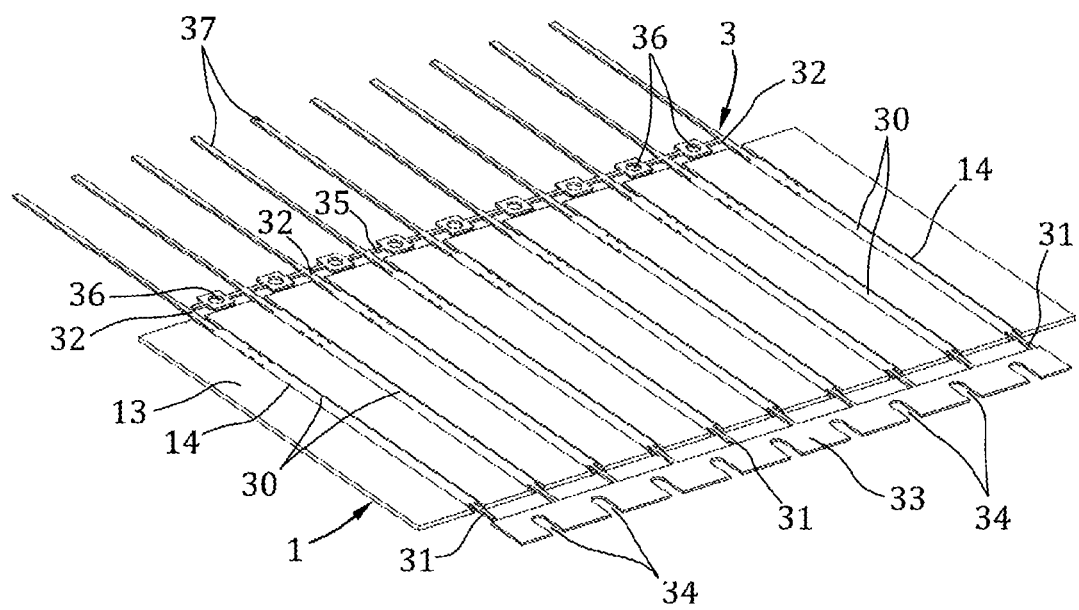

In a third step schematically illustrated in FIG. 5, the method comprises a step of providing a gauge 3 and of setting the gauge 3 on the inner face 13 of the first cover plate 1.

The gauge 3 is formed of an integral or one-piece completely metallic part, and this gauge comprises:

several longilineal inserts 30 extending parallel and spaced apart one after the other and having front ends 31 and respective rear ends 32;

a front bridge 33 joining the front ends 31 of all the longilineal inserts 30 and having front indexing disposed between the longilineal inserts 30 and being in the form of notches 34;

a rear bridge 35 joining the rear ends 32 of all the longilineal inserts 30 and having rear indexing disposed between the longilineal inserts 30 and being in the form of holes 36;

rear rods 37 extending the longilineal inserts 30 beyond the rear bridge 35 and their rear ends 32.

Hence, the gauge 3 is set on the inner face 13 of the first cover plate 1, so that all the longilineal inserts 30 are disposed inside the grooves 14 and the front and rear bridges 33, 35 protrude from the first cover plate 10, and more specifically the front bridge 33 protrudes from a longitudinal edge 11 whereas the rear bridge 35 protrudes from the other longitudinal edge 11. It should be noted that the rear rods 37 also protrude from the first cover plate 10. The grooves 14 have a depth (z direction) substantially equivalent to the thickness of the longilineal inserts 30 so that the longilineal inserts 30 do not project from (i.e. above (+z direction)) the inner face 13 of the first cover plate 1, within mounting tolerances.

Figure 6:
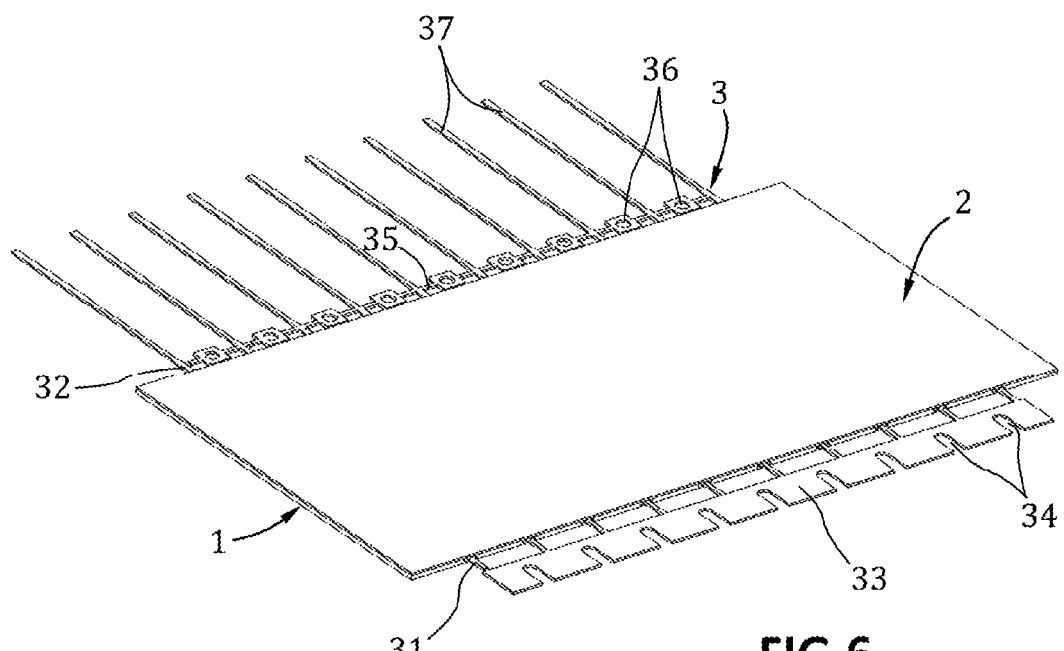

In a fourth step schematically illustrated in FIG. 6, the method comprises a step of pressing and bonding a second cover plate 2 on the inner face 13 of the first cover plate 1, so that:

the longilineal inserts 30 are inserted between the first cover plate 1 and the second cover plate 2;

the front and rear ends 31, 32 of the longilineal inserts 30 protrude from the first cover plate 1 and the second cover plate 2; and therefore the front and rear bridges 33, 35 protrude from the first cover plate 1 and the second cover plate 2, and also the rear rods 37 protrude from the first cover plate 1 and the second cover plate 2.

In some variations of the present disclosure, the second cover plate 2 has a rectangular general shape with the same length and the same width as the first cover plate 1, and is pressed and bonded on the first cover plate 1 in an adjusted or coincident manner. In at least one variation the second cover plate 2 is formed of a single layer of material. Moreover, in at least one but non-limiting form, this layer of material is made of wood in order to form with the first cover plate 1 an arm external covering made of laminated wood. It is still possible to consider using for this layer of material other types of material, such as plastic or polymeric materials, and natural materials such as horn among others.

Alternatively, the second cover plate 2 is formed by stacking and bonding at least two layers of material in order to obtain a second laminated cover plate 2, and also in order to form with the first cover plate 1 an arm external covering made of stratified wood. It is still possible to consider using for the layers of material of this second cover plate 2 other types of material, such as plastic or polymeric materials, and natural materials such as horn, among others.

Thus, at the end of the fourth step, the longilineal inserts 30 are interposed between the first cover plate 1 and the second cover plate 2, inside the grooves 14; these two cover plates 1, 2 being bonded together.

Figure 7:
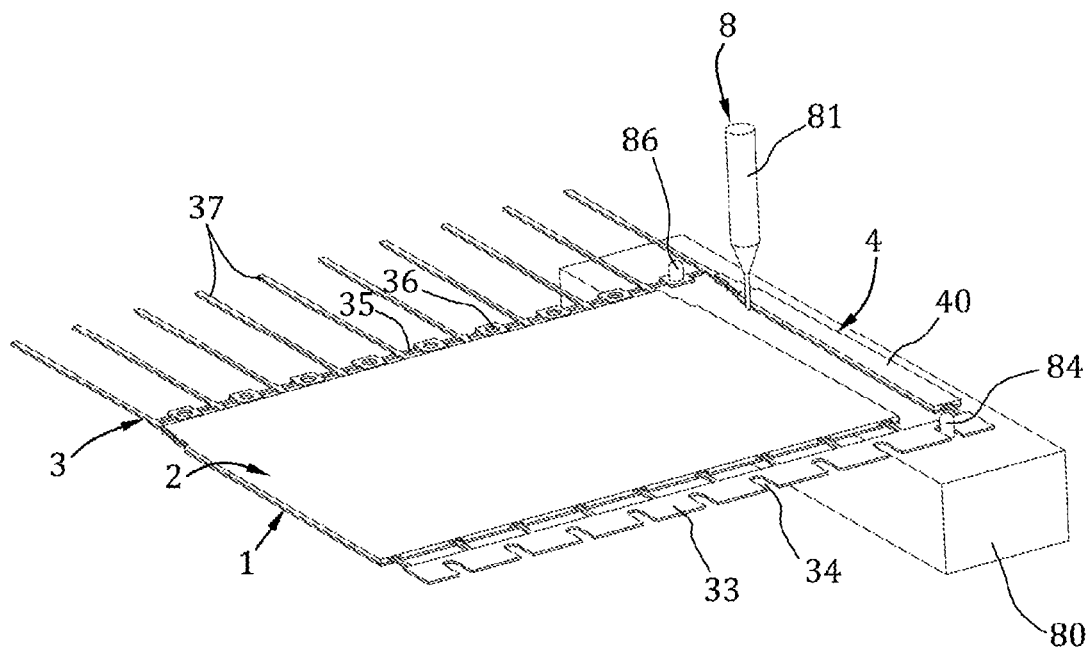

In a fifth step schematically illustrated in FIGS. 7 and 8, the method comprises a step of cutting the first cover plate 1 and the second cover plate 2 with a cutting tool 8 around the longilineal inserts 30 in order to form spectacle arms 4. The cutting tool 8 comprises a frame 80 provided with indexing pins 84, 86, namely a front indexing pin 84 and a rear indexing pin 86, and also a cutter 81 such as a saw, a cutting wire, and a pulsed jet, among others capable of cutting the layers forming the two assembled cover plates 1, 2.

In some variations the cutting tool 8 performs the cutting the first cover plate 1 and the second cover plate 2 spectacle arm 4 by spectacle arm 4, in other words by making cuts around a longitudinal insert 30, then by being displaced to make cuts around a next longitudinal insert 30, and so on to the last longitudinal insert 30.

Prior to cutting around a longilineal insert 30, the cutting tool 8 is positioned and held in place with respect to the longilineal insert 30 by cooperating with both a notch 34 of the front bridge 33 forming a front indexing and with a hole 36 of the rear bridge 35 forming a rear indexing; where the notch 34 and the hole 36 are adjacent to the longilineal insert 30.

To this end, the cutting tool 8 is positioned and held in place with respect to this longilineal insert by the front indexing pin 84 which is engaged into a notch 34 of the front bridge 33 and by the rear indexing pin 86 which is engaged into a hole 36 of the rear bridge 35. In this way, the indexing and the accurate positioning of the cutting tool 8 provides cuts around the longilineal inserts 30 that are accurate and neat.

At the end of this fifth step, spectacle arms 4 are obtained comprising longilineal inserts 30 surrounded by external coverings 40, where:

these external coverings 40 are formed of the cut portions of the two bonded cover plates 1, 2, the longilineal inserts 30 have front ends 31 protruding from the external coverings 40 and on which hinges will be fixed to articulate frames;

the longilineal inserts 30 have rear ends 32 protruding from the external coverings 40 and are extended by the rear rods 37 adapted to be bent and to bear against the ears of the wearers when in place.

At the end of this fifth step, the spectacle arms 4 are interconnected by the front and rear bridges 33, 35.

In a sixth step illustrated in FIG. 9, the method comprises a step of cutting the front bridge 33 and the rear bridge 35 between the longilineal inserts 30. That is, cutting the front bridge 33 between the front ends 31 of the longilineal inserts 30 and a cutting the rear bridge 35 between the rear ends 32 of the longilineal inserts 30 disengages the spectacle arms 4 from one another.

At the end of this sixth step, the spectacle arms 4 are disengaged and therefore independent, FIG. 10 illustrating a single spectacle arm 10 alone.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method of manufacturing spectacle arms, comprising:
    grooving an inner face of a first cover plate, so as to form a plurality of grooves in said inner face, wherein the plurality of grooves extend parallel and are spaced apart one after the other;
    providing a gauge comprising:
        a plurality of longilineal inserts extending parallel and spaced apart one after the other and having respective front ends and rear ends;
        a front bridge joining the front ends of the longilineal inserts and having front indexing means disposed between the longilineal inserts;
        a rear bridge joining the rear ends of the longilineal inserts and having rear indexing means disposed between the longilineal inserts;
    setting the gauge on the inner face of the first cover plate so that the longilineal inserts are disposed inside the grooves and that the front bridge and the rear bridge protrude from the first cover plate;
    pressing and bonding a second cover plate on the inner face of the first cover plate so that the longilineal inserts are inserted between the first cover plate and the second cover plate and that the front bridge and the rear bridge protrude from the first cover plate and the second cover plate; and
    cutting the first cover plate and the second cover plate with a cutting tool around the longilineal inserts in order to form spectacle arms, wherein the cutting tool prior to cutting around a longilineal insert is positioned and held in place with respect to said longilineal insert by cooperating with front indexing and rear indexing adjacent to said longilineal insert.

2. The method of manufacturing spectacle arms according to claim 1, wherein the front indexing and the rear indexing comprise holes or notches, and the cutting tool prior to cutting around a longilineal insert is positioned and held in place with respect to said longilineal insert by pins engaged into the holes or notches of the front indexing and the rear indexing adjacent to said longilineal insert.

3. The method of manufacturing spectacle arms according to claim 1 further comprising manufacturing the first cover plate by stacking and bonding at least two layers of material in order to obtain a first laminated cover plate.

4. The method of manufacturing spectacle arms according to claim 3, wherein the at least two layers of material of the first cover plate are wood layers.

5. The method of manufacturing spectacle arms according to claim 3, wherein the second cover plate is formed of a single layer of material.

6. The method of manufacturing spectacle arms according to claim 5, wherein the layer of material of the second cover plate is formed of the same material as one of the layers of material of the first cover plate.

7. The method of manufacturing spectacle arms according to claim 1 further comprising manufacturing the second cover plate by stacking and bonding at least two layers of material in order to obtain a second laminated cover plate.

8. The method of manufacturing spectacle arms according to claim 7, wherein the at least two layers of the first laminated cover plate are formed of the same material as the at least two layers of material of the second laminated cover plate.

9. The method of manufacturing spectacle arms according to claim 1, wherein the longilineal inserts of the gauge are extended by rear rods beyond of the rear bridge such that said rear rods protrude from the first cover plate and the second cover plate after pressing and bonding the second cover plate.

10. The method of manufacturing spectacle arms according to claim 1, wherein the gauge is metallic.

11. The method of manufacturing spectacle arms according to claim 1 further comprising cutting the front bridge and the rear bridge between the longilineal inserts such that the spectacle arms are disengaged from one another.

* * * * *